United States Patent [19]

Weinberger

[11] Patent Number: 4,682,062
[45] Date of Patent: Jul. 21, 1987

[54] ANTI-THEFT SYSTEM FOR MOTOR VEHICLES

[76] Inventor: Zvi Weinberger, Ramot 03-345/43, Jerusalem, Israel

[21] Appl. No.: 833,288

[22] Filed: Feb. 27, 1986

[30] Foreign Application Priority Data

Feb. 27, 1985 [IL] Israel .......................................... 74461

[51] Int. Cl.⁴ ............................................ B60R 25/00
[52] U.S. Cl. .................. 307/10 AT; 340/64; 180/287
[58] Field of Search .............. 307/10 T; 180/287; 123/198 B, 146.5 B; 340/64, 825.32

[56] References Cited

U.S. PATENT DOCUMENTS

| | | | |
|---|---|---|---|
| 3,544,804 | 12/1968 | Gaumer et al. | 307/10 AT |
| 3,710,316 | 1/1973 | Kromer | 307/10 AT X |
| 3,718,202 | 2/1973 | Brock | 307/10 AT X |
| 3,766,400 | 10/1973 | Walters | 307/10 AT |
| 3,784,839 | 1/1974 | Weber | 180/287 X |
| 3,788,422 | 1/1974 | Bowler | 307/10 AT X |
| 3,796,889 | 3/1974 | Fradkin et al. | 307/10 AT X |
| 3,947,693 | 3/1976 | Eskenas | 307/10 AT |
| 4,090,089 | 5/1978 | Morello et al. | 307/10 AT X |
| 4,141,332 | 2/1979 | Wyler | 123/198 B X |
| 4,180,043 | 12/1979 | Kawamura | 307/10 AT X |
| 4,206,491 | 6/1980 | Ligman et al. | 307/10 AT X |
| 4,278,963 | 7/1981 | Allen | 307/10 AT X |
| 4,288,778 | 9/1981 | Zucker | 307/10 AT X |
| 4,327,353 | 4/1982 | Beard et al. | 180/287 X |
| 4,438,426 | 3/1984 | Adkins | 307/10 AT X |
| 4,438,752 | 3/1984 | Cheung | 307/10 AT X |
| 4,447,850 | 5/1984 | Asher | 307/10 AT X |
| 4,463,340 | 7/1984 | Adkins et al. | 307/10 AT X |
| 4,553,511 | 11/1985 | Hayakawa et al. | 180/287 X |

Primary Examiner—William M. Shoop, Jr.
Assistant Examiner—Sharon D. Logan
Attorney, Agent, or Firm—Benjamin J. Barish

[57] ABSTRACT

An anti-theft system for motor vehicles, comprises a code input device for inputing a code; a storage device for storing a predetermined code; an electronic system for comparing the inputted code with the stored code; and an enabling device actuated when the inputted code corresponds to the stored code. The enabling device is effective, when actuated, to enable starting the vehicle engine by the vehicle ignition switch being turned to its On-position. The system further includes a manually operable reset device effective, when operated with the ignition switch in its Off-position, to deactuate the enabling device, but not effective when operated with the ignition switch in its On-position to deactuate the enabling device.

18 Claims, 5 Drawing Figures

ANTI-THEFT SYSTEM FOR MOTOR VEHICLES

BACKGROUND OF THE INVENTION

The present invention relates to anti-theft systems for motor vehicles, and particularly to a system which prevents the operation of the motor vehicles unless a coding device, such as a combination code keyboard, is properly operated.

A large number of diverse types of systems for preventing theft of motor vehicles have been devised, but the known systems generally are far from entirely satisfactory, which is evident from the fact that this problem of motor vehicles thefts has not diminished. Thus, one type of system includes mechanical locking devices, for example for locking the steering wheel or accelerator pedal; but such mechanical devices are inconvenient to use, time-consuming in applying and removing, and easily rendered ineffective by professional thieves having equipment for breaking or cutting the mechanical devices. Another type of theft-prevention system includes alarms which are actuated when an unauthorized attempt is made to penetrate the vehicle; such systems, however, usually suffer from a high rate of false alarms thereby diminishing their credibility when actuated, and also subjecting the owner to considerable inconvenience. A third type of anti-theft system includes electrical switches or similar devices located at a secret place known only to the authorized user which can be used for disabling the vehicle ignition system, the fuel supply, or the like, in order to prevent the operation of the vehicle; such secret switches, however, are easily circumvented by a professional thief by merely tracing the wires under the hood.

A still further type of anti-theft system includes a coding device, such as a keyboard, which allows the operator to input a code. The code is compared to a predetermined code stored within the system to control an enabling device which enables the starting and operation of the vehicle only when a match occurs. Examples of the latter type of anti-theft systems are described in U.S. Pat. Nos. 4,447,850, 4,438,426, 4,180,043, 4,090,089, 3,947,693, 3,788,422, 3,718,202, and 3,544,804.

An object of the present invention is to provide an anti-theft system for motor vehicles of the latter type but having advantages in a number of respects as will be described more particularly below.

BRIEF SUMMARY OF THE INVENTION

According to one aspect of the present invention, there is provided an anti-theft system for motor vehicles, comprising: a vehicle ignition switch for starting the vehicle when turned to an On-position and for terminating vehicle operation when turned to an Off-position; a code input device for inputing a code; a storage device for storing a predetermined code; an electronic system including comparison means for comparing the inputted code with the stored code; an enabling device actuated by the comparison means when the inputted code corresponds to the stored code; the enabling device being effective, when actuated, to enable starting the vehicle engine by the vehicle ignition switch being turned to its On-position; and a manually operable reset device effective, when operated with the ignition switch in its Off-position, to deactuate the enabling device, but not effective, when operated with the ignition switch in its On-position, to deactuate the enabling device.

Such an arrangement provides protection against disabling the vehicle by accidentally moving the reset device while the vehicle is in normal operation; it also obviates the need to reinsert the code if the engine stalls.

According to another aspect of the invention, the system further includes a manually operable protection-disable device effective, when operated, to disable the reset device from deactuating the enabling device when the reset device is operated with the ignition switch in its Off-position. This arrangement allows the driver to turn over the vehicle to another without requiring the driver to disclose the code in order to permit normal operation of the vehicle. This feature is desirable, for example, when leaving the vehicle in a parking lot where the parking attendant is permitted to move the vehicle as required.

According to a still further feature, the code input device comprises a keyboard for inputting a plurality of numbers according to a predetermined combination and sequence; the electronic system comprising a resetting circuit effective to reset the comparison means whenever there is a deviation in the combination or sequence of the inputted numbers from the stored code before the enabling device is actuated, but ineffective to reset the comparison means whenever there is such a deviation after the enabling device has been actuated. Thus, once the enabling device, e.g., a relay, is actuated by inserting the proper code, it can be deactuated only by operating the reset device; this permits the user to obscure the correct code from another passenger in the vehicle, by inserting many numbers before and/or after the true code.

The invention is described below with respect to a preferred embodiment, wherein the enabling device includes an electrical relay which controls an electrical component, preferably the ignition coil, of the vehicle ignition system.

In the described preferred embodiment, the coding device is an electrical keyboard having decimal number keys for inputting a decimal code. The protection system thus requires the depression of the proper decimal number keys in the proper order to actuate the relay and to enable the operation of the electrical component. More particularly, the electrical circuit includes a decimal-to-binary encoder connected to the keyboard for encoding the decimal input into binary form; a binary transmission line; a binary-to-decimal decoder for decoding the keyboard input back to decimal form; a counter connected to the relay; and electrical connections connecting the decimal outputs of the decoder to the input of the counter according to the required predetermined code. The arrangement is such that inputting, via the keyboard, the proper combination of numbers in the proper sequence will sequentially step the counter a predetermined number of steps to actuate the relay, but inputting an improper number, or in an improper sequence, will reset the counter.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall Construction

Figure 1:
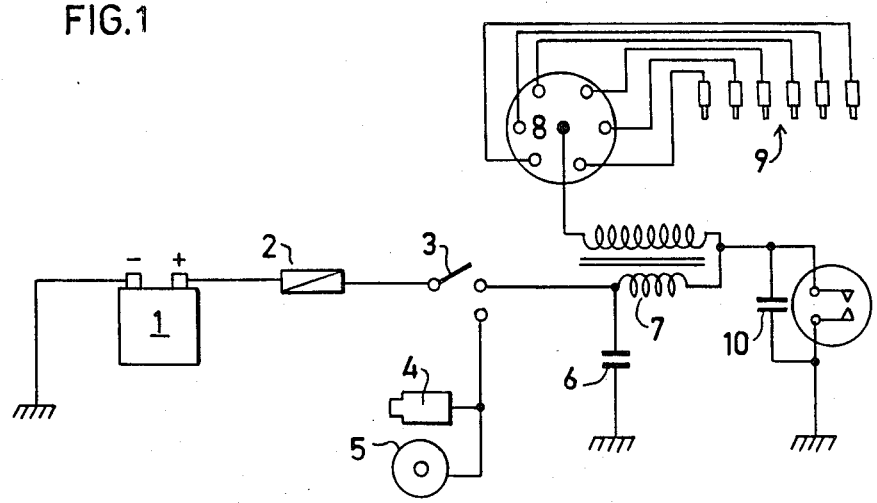
FIG. 1 is a simplified schematic diagram illustrating the ignition system of a motor vehicle.

With reference first to FIG. 1, there is illustrated a simplified electrical vehicle ignition system, including a battery 1, fuse 2, ignition switch 3, starter solenoid 4, starter 5, radio-suppression capacitor 6, ignition coil 7, distributor 8, spark plugs 9, contact breaker capacitor 10, and contact breaker 11. The operation of this type of ignition system is quite well-known and therefore need not be described here.

In the illustrated system, one of the electrical components in the ignition system illustrated in FIG. 1 is modified in order to prevent theft of the motor vehicle. Briefly, this is done by including, within the selected electrical component, an enabling device, in the form of an electrical relay, connected by an electrical circuit to a code input device externally of the component. The relay normally disables the electrical component from properly functioning, and thereby normally prevents starting the vehicle, unless the relay is properly actuated by the code input device, whereupon the component is enabled to permit starting the vehicle.

The electrical component selected for this purpose is preferably either the coil 7, or the contact breaker 11 illustrated in FIG. 1. There are advantages in selecting the coil 7 and therefore this is the electrical component which is used in the embodiment of the invention described below, to disable the motor vehicle in order to prevent its theft.

Figure 2:
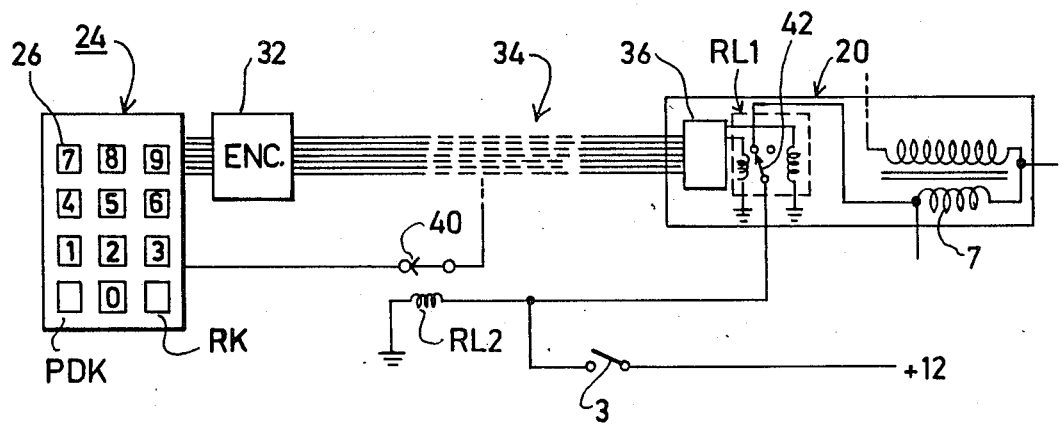
FIG. 2 is a schematic diagram illustrating an anti-theft system constructed in accordance with the present invention for incorporation in the vehicle ignition system of FIG. 1.

FIG. 2 broadly illustrates the anti-theft system including the ignition coil 7 of the vehicle ignition system. The latter coil is housed within a casing 20. This casing also includes a relay, generally designated RL1, which, in its normal condition, opens the circuit to coil 7 and thereby prevents the operation of the vehicle. Relay RL1, however, may be actuated by a code input device, illustrated in FIG. 2 as an electrical keyboard 24, having decimal number keys 26 identifying the numbers 0-9, which keys must be depressed according to a predetermined combination and sequence in order to actuate relay RL1 so as to enable ignition coil 7.

In addition to the decimal number keys 0-9, keyboard 24 also includes a reset RK key for deactuating relay RL1 to its normal condition disabling the ignition coil 7; and a protection-disable key PDK for disabling the keyboard 24 from changing the condition of relay RL1, i.e., leaving relay RL1 in its then existing condition. The purpose of key PDK is to enable the owner to permit another, e.g., parking attendant, to use the vehicle without disclosing to him the code. The protection-disable key PDK is preferably recessed to make it less accessible than the other keys, and thereby to minimize its accidental depression.

Keyboard 24 further includes an encoding circuit, represented by block 32, for converting the digital input into the keyboard into binary form. This information is transmitted in binary form via conductors 34 to a decoding circuit, represented by block 36. Circuit 36 decodes the binary information back to digital information and, if the input matches the stored code, actuates relay RL1 to enable the ignition coil 7.

Figure 3:
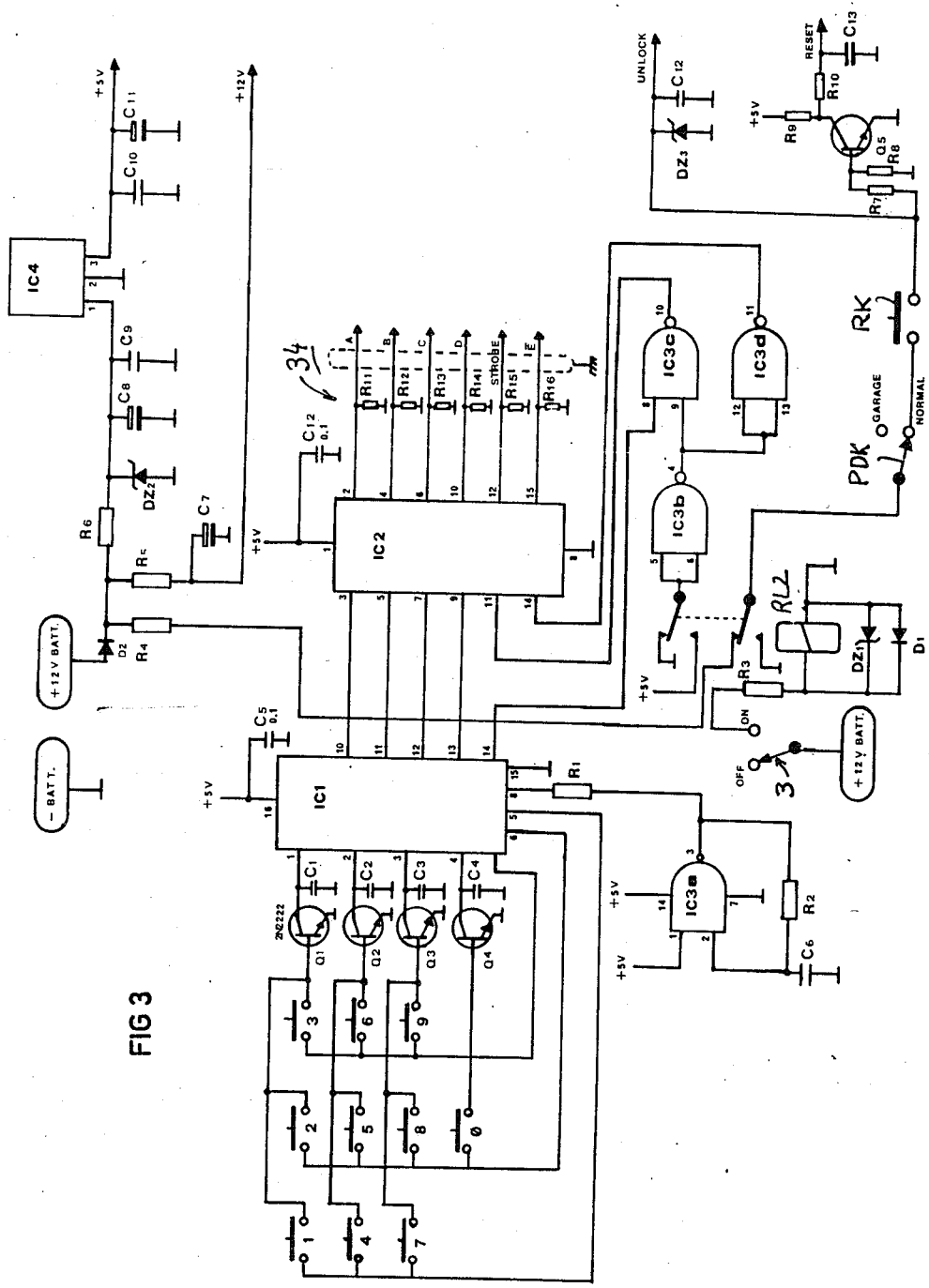
FIG. 3 a block diagram illustrating the encoder circuit connected to or included within the keyboard in the anti-theft system of FIG. 2.

The encoding circuit 32 is more particularly illustrated in FIG. 3. It is preferably included within the casing of keyboard 24. The decoding circuit 36 is more particularly illustrated in FIG. 4, and is preferably included, with relay RL1, within casing 20 of the ignition coil 7.

FIG. 2 illustrates the vehicle ignition switch 3 in its normally open condition. Further illustrated in FIG. 2 is another relay RL2 which is connected to the vehicle ignition switch 3 such that relay RL2 is energized when the ignition switch is closed. In the normal non-energized condition of relay RL2 (i.e., when the ignition switch 3 is "off"), its contacts are closed so as to establish communication between keyboard 24, and decoder 36 connected to relay RL1 within casing 20 of the ignition coil 7. However, when the vehicle ignition switch 3 is "on", relay RL2 is actuated to open its electrical contacts and thereby to disconnect the keyboard.

Thus, the ignition coil 7 can be enabled for proper operation of the vehicle only when the ignition switch 3 is turned, off, i.e. when the vehicle is not operating. It has been found that such an arrangement provides a higher degree of reliability since, during the operation of the motor vehicle, strong electromagnetic fields are produced which could disturb the proper functioning of the encoder or decoder electronics, or supply spurious signals which could accidentally operate relay RL1.

Relay RL1 within the ignition coil casing 20 is of the self-latching type. That is, once it is actuated by the inputting of the proper code combination via keyboard 24 (which, as noted above, must be done when the vehicle ignition switch is turned off), relay RL1 remains in its actuated condition even when the vehicle ignition switch 3 is turned on.

Once the ignition coil 7 is enabled, by the introduction of the proper code into the keyboard 24 to actuate relay RL1, the ignition coil can be disabled only by depressing the reset key RK. This has been found to be advantageous in that it enables the operator to obscure the code, e.g., by depressing a number of keys before inserting the true code and/or after inserting the true code, so long as the predetermined combination and sequence of numbers is inserted at some time before the system is reset by an uncorrect number in the sequence or by depressing the reset key RK.

In addition, once the enabling relay RL1 has been actuated, and the ignition switch 3 turned to its "on" position thereby actuating relay RL2 (whether or not the engine has actually been started), the enabling relay RL1 cannot be deactuated even if the reset key RK, or another code key, is depressed. This arrangement prevents accidentally disabling the vehicle while the vehicle is being operated; also, it avoids the need to reinsert the code if the engine stalls while starting, or while operating.

Encoder Circuit 32 (FIG. 3)

The encoder circuit 32, as illustrated in FIG. 3, includes an integrated circuit chip IC1 which converts, via transistor switches Q1–Q5, the digital information inputted by the depression of the numerical keys 26 of keyboard 24 into binary information. Thus, each digital value 0-9 is represented by 4 bits of binary information. These binary bits are transmitted via a buffer circuit IC2 through the four conductors A–D of the binary transmission line 34 to the decoder 36 (FIG. 4) for the ignition coil relay RL1.

Conductors 34 include two further conductors, identified as "strobe" and "E", respectively. The "strobe" conductor applies strobe or clock pulses for incrementing a counter in the decoder circuit 36; the "E" conductor connects the counter to "ground" and thereby enables it to be incremented in order to determine whether the inputted code matches the predetermined code stored within the decoder for actuating relay RL1.

Both of the foregoing functions, are performed only when the vehicle ignition switch 3 is off. Thus, switch 3 controls relay RL2 which, in its normal condition when not actuated by the ignition switch 3, transmits strobe pulses generated by integrated circuit IC3a and encoder IC1 via integrated circuits IC3a, IC3b, IC3c to buffer IC2 for transmission via conductors 34. In addition, when relay RL2 is in its normal condition (not actuated by ignition switch 3), it also transmits a "ground" signal "E" via buffer IC2 to conductors 34. However, when ignition switch 3 is turned on, relay RL2 is actuated so as to terminate the transmission of the strobe pulses and also of the "ground" signal "E", thereby disabling the decoder 26 from actuating relay RL1.

FIG. 3 further illustrates reset key RK in keyboard 24 which, when depressed, deactuates relay RL1 and thereby disables the ignition coil 7 from proper operation. Key RK is in turn disabled from resetting the relay whenever the ignition switch 3 is on.

Encoder circuit IC1 converts the members inputted via the keyboard 24 from decimal to binary, actually binary-coded-decimal (BCD) and, outputs the BCD code to buffer IC2 with each depression of the numbered keys of the keyboard. Encoder IC1 also contains known automatic keybounce circuitry, and will output a strobe (data valid) pulse only after 80 clock pulses have been counted after the last transition of any input. The clock pulses are generated by integrated circuit IC3a.

Buffer IC2 protects the system from statics. Resistors R11-R16 are included to prevent static buildup when the unit is disconnected from the connecting cable.

Integrated circuit IC3b is connected to integrated circuit IC3c and functions as a gate to pass or block the strobe pulses. Integrated circuit IC3d pulls the enable line high for the counter (in the decoding circuit of FIG. 4) when the ignition switch 3 is in the "on" position, thereby preventing the counter to change its state.

Integrated circuit IC4 is a voltage regulator. Diode D2 prevents negative polarity from reaching the encoding circuitry. Transistor Q5 keeps the reset line "high" normally, this line switching to "low" when the reset key RK is depressed.

Figure 4:
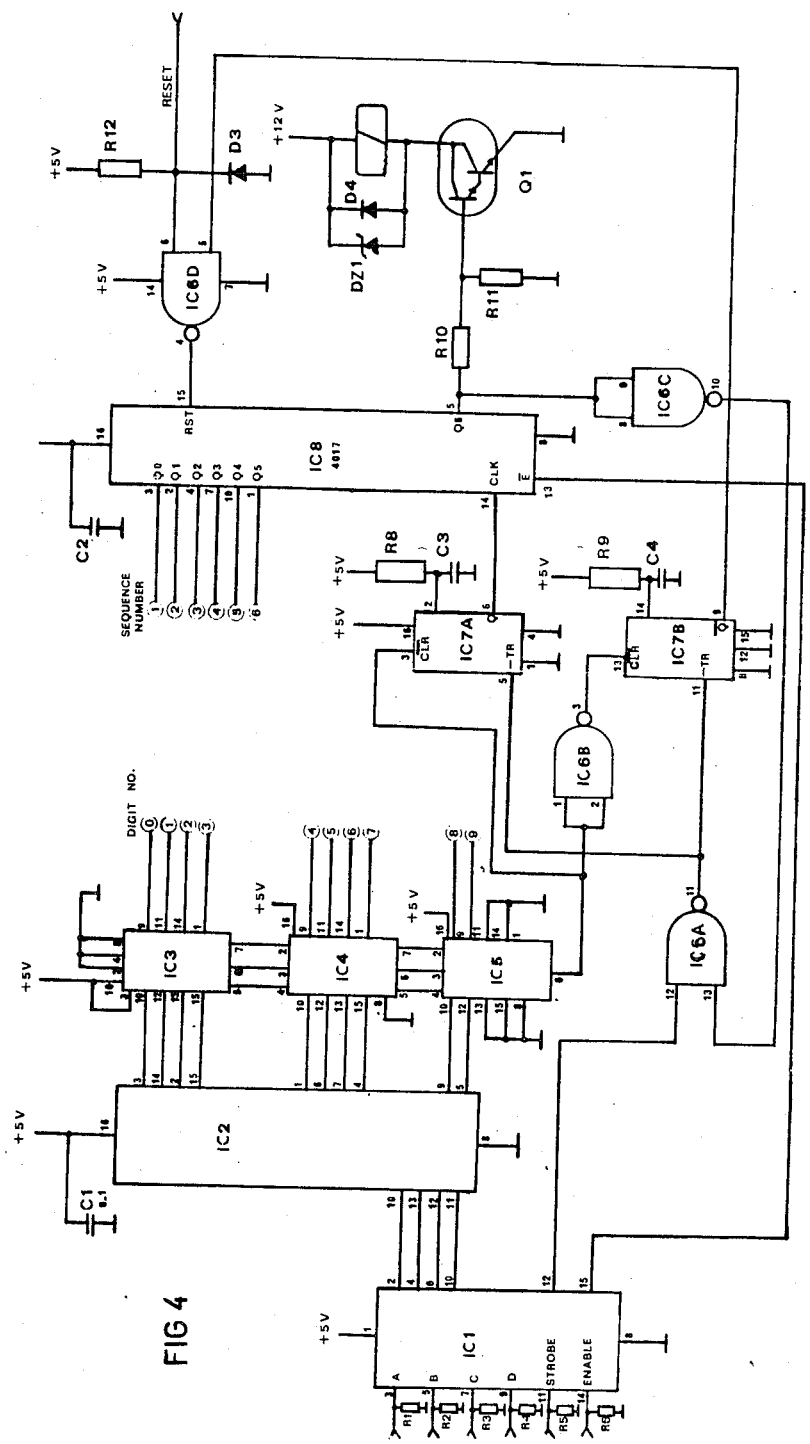
FIG. 4 is a block diagram illustrating the decoder circuit included within the electrical component of the vehicle ignition system in the arrangement illustrated in FIG. 2.

Voltage regulator IC4 supplies a regulated 5 volts to the encoder unit 32 illustrated in FIG. 3, and also to the decoder unit illustrated in FIG. 4. Integrated circuit IC4 simultaneously functions as a voltage-rise protector in case the battery voltage exceeds its nominal 13.6 volt. To protect integrated circuit IC4 against very high voltage excursions, such as can be expected during normal driving conditions, Zener diode DZ2 clips the supply voltage to safe limits. Resistor R6 and capacitors C8-C11 further stabilize the circuitry. Resistor R10 and capacitor C13 are interference protection components.

Zener diode DZ1 and resistor R3 are included to limit the voltage to the relay coil RL2 to 12 volts to prevent overheating of the coil winding. A 12 volt supply is fed to the enabling relay (RL1, FIGS. 2 and 4) via resistor R5 and is smoothed further by capacitor C7.

Decoder Circuit 36 (FIG. 4)

Decoder circuit 36 (FIG. 2) is more particularly illustrated in FIG. 4. It comprises a buffer circuit IC11, a BCD-to-decimal decoder circuit IC12, and 4-bit comparators IC13, IC14, IC15, which compare the 4 bits on the left sided inputs with the 4 bits on the right sided inputs. If the data on the left side is identical with the data on the right side, pin "6" on circuit IC15 goes "high". The three comparators are cascaded, and pin "6" of comparator IC15 will only go "high" if all bits are identical in all three comparators.

Circuits IC16a, IC16b, are quad Schmitt triggers, and circuits IC17a, IC17b are dual monostables. Circuit IC18 is a counter which receives ten outputs, representing the digits 0-9, from circuits IC13, IC14 and IC15. Thus, inputs to counter IC18 are connected by electrical connections 70 to the outputs of circuits IC13, IC14, IC15 according to the required predetermined code. These electrical connections 70 may be, for example, jumper wires which can be changed whenever a change is desired to be made in the predetermined code stored within the system. The electrical connections 70 illustrated in FIG. 4 specify the code "785619" which numbers, if inputted into the keyboard in the sequence set forth, will step counter IC18 one increment for each inputted number. In such case, the counter will output a "Valid Code" signal via its ouput line 72 to the enabling relay RL1 to actuate it, and thereby to enable starting the vehicle. If, however, one of the numbers inputted into keyboard is not the same as in the stored code combination, counter IC18 will be reset, so that no "valid code" signal will be outputted via its output line 72 to relay RL1.

The binary signals from the encoder illustrated in FIG. 3 are fed to the decoder illustrated in FIG. 4 via the buffer circuit IC11, FIG. 4. The latter buffer circuit also feeds the "strobe" pulses and the "ground" signal ("E") to counter IC18. The "E" signal is fed to counter IC18 via the monostables IC17a, IC17b to serve as clock signals for incrementing the counter with each pulse applied. Buffer IC11 also supplies the "ground" signal ("E") to counter IC18 to enable it to operate only when such a signal is present.

When the code is inserted, any deviation from the predetermined combination and sequence of the stored code will cause pin "5" of counter IC18 to go "low". This will cause integrated circuit IC16c to produce a reset pulse via circuits IC16a, IC17b and IC16d, to reset the counter. Counter IC18 is also reset by the reset signal produced by the depression of the reset key RK of the keyboard 24, the latter signal being applied via gate IC16d to the reset terminal of the counter.

Operation

The illustrated system operates as follows:

In the normal condition of the vehicle, with the ignition switch 3 turned off, relay RL1 will be in its normal condition disabling the ignition coil 7, and thereby disabling the operation of the vehicle. If the ignition switch 3 is turned on, relay RL1 will still remain in its initial condition disabling coil 20, so that the vehicle remains disabled and will not start.

In order to enable the vehicle for operation, it is necessary, before the ignition switch 3 is turned on, to introduce the predetermined code into keyboard 24 by depressing the numerical keys 26 according to the predetermined combination and sequence stored by the connections of wires 70 (FIG. 4). The digital numbers so inputted into keyboard 24 are converted to BCD by integrated circuit IC1 (FIG. 3) of encoder 32, and are transmitted in BCD form via conductors 34 to decoder 36 (FIG. 4). The latter decoder reconverts the inputted code into decimal form which appears as decimal digits in the outputs 0-9. These outputs are connected, via the coded arrangement of the electrical connections 70, to the six inputs into counter IC18 according to the predetermined code, so that when the predetermined code is inputted into keyboard 24, counter IC18 is incremented six steps (in the illustrated example) to produce a "Valid Code" output on its line 72 to actuate the relay RL1. This enables the ignition coil 7 for operation to ignite the vehicle engine and to permit the vehicle to be driven in its normal manner.

If, however, one of the inputs is not identical to the predetermined code, or is not in the proper sequence of the predetermined code, counter IC18 will be immediately reset, thereby preventing the outputting of the "valid code" signal on its output line 72.

More particularly, when a key 26 on the keyboard 24 is depressed, and with the ignition switch 3 in the "off" position, the number of that key is decoded by decoder IC12, and the relevant output pin will go "high", all the other output pins remaining at "low". For example, if the value "3" has been introduced into keyboard 24, output pin No. 15 of decoder IC12 will go "high". Decimal counter IC18 is normally reset, and therefore output pin No. 3 of this circuit is also "high". If the number "3" is the first correct number of the stored code, by the connections of jumper wires 70, output pin "6" of comparator IC16 will be "high".

Pin "3" of monostable circuit IC17a will therefore also be high, enabling it to trigger a pulse; but pin "13" of circuit IC17b will be low, preventing it from triggering a pulse.

Nothing further happens until the strobe pulse arrives indicating that the data (number "3") is valid. The strobe pulse is gated by trigger IC16a, which will pass or block the strobe pulse from being fed to monostable circuits IC17a, IC17b simultaneously. If the gate is open, the strobe pulse will arrive at trigger inputs "5" and "11" of monostable IC7, but only IC17a will trigger and produce a clock pulse to counter IC18 to advance it one count.

If, however, the number entered was not the first number in the stored code, circuit IC17b will send a reset pulse to counter IC18 via gate IC16d, and the counter will immediately reset to "0".

The next number is introduced via the keyboard, and if correct, the same sequence is repeated.

When all the digits (six digits in our example) have been entered correctly and in the proper sequence corresponding to the code stored by the jumper wire connections 70, pin "5" of counter IC18 will go "high." When this occurs, gates IC16c and IC16a block any further strobe pulses, thereby locking out the keyboard data. Any further depression of buttons on the keyboard will therefore have no effect on counter IC18.

When pin 5 in counter IC18 goes "high", upon the entering of the correct code, transistor Q1 is energized which in turn energizes relay RL1. This enables the ignition coil 7 for operation to ignite the vehicle engine when the ignition switch 3 is turned on.

Once relay RL1 is energized by the correct code, the relay can be deenergized only by depressing the reset key RK. This arrangement permits the operator to obscure the true code from other passengers of the vehicle, for example by inserting many numbers before the correct sequence, and/or after inserting the correct sequence.

It will also be seen that once the correct code is inserted, thereby actuating relay RL1, the ignition switch 3 may then be turned to its "on" position to start the engine. Once the ignition switch is turned "on", whether or not the engine is operating, relay RL1 cannot be deactuated even if the reset key RK, or another code key, is depressed. This arrangement prevents accidentally disabling the vehicle while it is being operated, and it also obviates the need to reinsert the code if the engine stalls.

If the operator wishes, for example, to leave the car with a garage attendant without disclosing the code to him and while still permitting him to drive the car, the operator merely depresses the protection-disable key PDK to move its contact from "Normal" to "Garage". This disables the reset key RK from resetting the system, and the vehicle can therefore be started, switched off, and restarted in the usual manner as if the vehicle were not equipped with the electronic anti-theft system. If, however, the circuit had been reset before depressing PDK, then it would be necessary to introduce the code in order to actuate relay RL1 and then to depress the PDK key.

Figure 5:
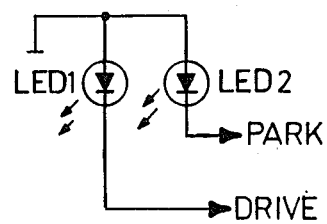
FIG. 5 is a diagram illustrating two light indicators included in the system of FIGS. 3 and 4.

Indicators (FIG. 5)

FIG. 5 illustrates two light indicators to indicate the condition of the protective system. Thus, indicator LED1 is energized to indicate the "Drive" mode, when the correct code has been introduced and enabling relay RL1 has been actuated, thereby permitting the operator to start the engine by the use of the ignition switch 3. Indicator LED2 is energized to indicate the "Park" mode, when relay RL1 is not energized, thereby disabling the system and requiring the operator to introduce the correct code into the keyboard 24 before turning on the ignition switch.

While the invention has been described with respect to one preferred embodiment, it will be appreciated that many other variations, modifications and applications of the invention may be made.

What is claimed is:

1. An anti-theft system for motor vehicles, comprising:
   a vehicle ignition switch for starting the vehicle when turned to an On-position and for terminating vehicle operation when turned to an Off-position;
   a code input device for inputing a code;
   a storage device for storing a predetermined code;
   an electronic system including comparison means for comparing the inputted code with the stored code;
   an enabling device actuated by said comparison means when the inputted code corresponds to the storage code;
   said enabling device being effective, when actuated, to enable starting the vehicle engine by the vehicle ignition switch being turned to its On-position;
   a manually operable reset device effective, when operated with the ignition switch in its Off-position, to deactuate said enabling device, but not effective when operated with the ignition switch in its On-position to deactuate the enabling device;

and a manually operable protection-disable device effective, when operated, to disable said reset device from deactuating said enabling device when the reset device is operated with the ignition switch in its Off-position.

2. The system according to claim 1, wherein:
said code input device comprises a keyboard for inputting a plurality of predetermined numbers according to a predetermined combination and sequence;
said electronic system comprising a resetting circuit effective to reset the comparison means whenever there is a deviation in the combination or sequence of the inputted numbers before the enabling device is actuated, but ineffective to reset the comparison means whenever there is such a deviation after the enabling device has been actuated.

3. The system according to claim 2, wherein said manually operable reset device is a key on said keyboard.

4. The system according to claim 3, wherein said manually operable protection-disable device is another key on said keyboard.

5. The system according to claim 4, wherein said protection-disable key is mounted on said keyboard in a recess such as to be less accessible to the user than the code input keys on the keyboard.

6. The system according to claim 1, wherein said comparison means comprises:
a decimal-to-binary encoder connected to said keyboard for encoding the decimal input into binary form;
a binary transmission line;
a binary-to-decimal decoder within said electrical component for decoding said keyboard input back to decimal form;
a counter connected to said enabling device;
and electrical connections connecting the decimal outputs of said decoder to the input of said counter according to the required predetermined code such that inputting via said keyboard of the proper combination of numbers in the proper sequence sequentially steps said counter a predetermined number of steps to actuate said enabling device, but inputting an improper number, or in an improper sequence, will reset said counter.

7. The system according to claim 6, further including means for producing strobe pulses for incrementing said counter only when the vehicle ignition switch is turned off.

8. The system according to claim 1, wherein said enabling device includes an electrical relay which is to be actuated in order to permit starting the vehicle.

9. The system according to claim 8, wherein said enabling device is an electrical relay which controls an electrical component in the vehicle ignition system.

10. The system according to claim 9, wherein said electrical component is the ignition coil of the vehicle ignition switch.

11. The system according to claim 10, wherein said electrical relay is encased in the same casing as said ignition coil.

12. An anti-theft system for motor vehicles, comprising:
a vehicle ignition switch for starting the vehicle when turned to an On-position and for terminating vehicle operation when turned to an Off-position;
a code input device for inputing a code;
a storage device for storing a predetermined code;
an electronic system including comparison means for comparing the inputted code with the stored code;
an enabling device actuated by said comparison means when the inputted code corresponds to the stored code;
said enabling device being effective, when actuated, to enable starting the vehicle engine by the vehicle ignition switch being turned to its On-position;
a reset device effective to deactuate said enabling device;
and a manually operable protection-disable device effective, when operated, to disable said reset device from deactuating said enabling device when the reset device is operated with the ignition switch in its Off-position.

13. The system according to claim 12, wherein said reset device is a manually operable reset device effective, when operated with the ignition switch in its Off-position, to deactuate said enabling device, but not effective, when operated with the ignition switch in its On-position, to deactuate the enabling device.

14. The system according to claim 12, wherein said code input device comprises a keyboard for inputting a plurality of numbers according to a predetermined combination and sequence;
said electronic system comprising a resetting circuit effective to reset the comparison means whenever there is a deviation in the combination or sequence of the inputted numbers from the stored code before the enabling device is actuated, but ineffective to reset the comparision means whenever there is such a deviation after the enabling device has been actuated.

15. An anti-theft system for motor vehicles, comprising:
a vehicle ignition switch for starting the vehicle when turned to an On-position and for terminating vehicle operation when turned to an Off-position;
a code input device for inputing a code;
a storage device for storing a predetermined code;
an electronic system including comparison means for comparing the inputted code with the stored code;
an enabling device actuated by said comparison means when the inputted code corresponds to the stored code;
said enabling device being effective, when actuated, to enable starting the vehicle engine by the vehicle ignition switch being turned to its On-position;
said code input device comprising a keyboard for inputting a plurality of numbers according to a predetermined combination and sequence;
said electronic system comprising a resetting circuit effective to reset the comparison means whenever there is a deviation in the combination or sequence of the inputted numbers from the stored code before the enabling device is actuated, but ineffective to reset the comparision means whenever there is such a deviation after the enabling device has been actuated;
a reset device effective to deactuate said enabling device;
and a manually operable protection-disable device effective, when operated, to disable said reset device from deactuating said enabling device when the reset device is operated with the ignition switch in its Off-position.

16. The system according to claim 15, wherein said reset device is a manually operable reset device effective, when operated with the ignition switch in its Off-position, to deactuate said enabling device, but not effective, when operated with the ignition switch in its On-position, to deactuate the enabling device.

17. The system according to claim 16, wherein said enabling device includes an electrical relay which is to be actuated in order to permit starting the vehicle.

18. The system according to claim 17, wherein said electrical relay controls an electrical component in the vehicle ignition switch.

* * * * *